Figure 1:
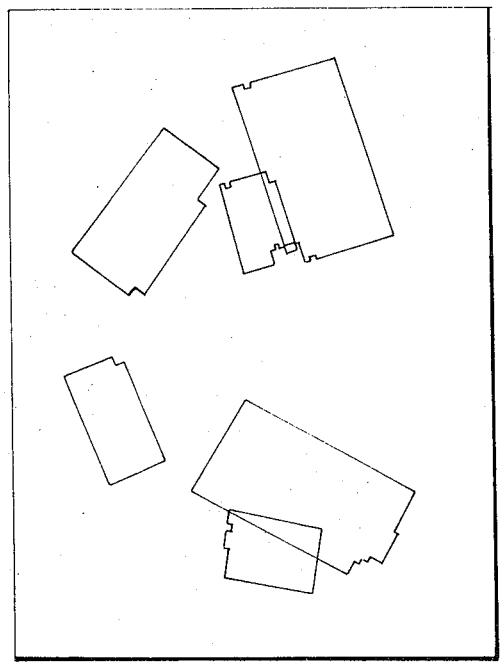

United States Patent [19]

Kutzbach

[11] 3,871,962

[45] Mar. 18, 1975

[54] PENICILLIN ACYLASE

[75] Inventor: Carl Kutzbach, Wuppertal, Germany

[73] Assignee: Bayer Aktiengesellschaft, Leverkusen, Germany

[22] Filed: Oct. 16, 1972

[21] Appl. No.: 297,856

[30] Foreign Application Priority Data
Oct. 14, 1971 Germany............................ 2151236
Apr. 13, 1972 Germany............................ 2217745

[52] U.S. Cl. ................ 195/62, 195/66 R, 195/36 P
[51] Int. Cl. ............................................. C07g 7/02
[58] Field of Search ................... 195/62, 66 R, 36 P

[56] References Cited
UNITED STATES PATENTS

| 3,297,546 | 1/1967 | Johnson et al. | 195/36 P |
|---|---|---|---|
| 3,446,705 | 5/1969 | Heuser et al. | 195/36 P |
| 3,664,926 | 5/1972 | Grabner et al. | 195/66 A |
| 3,736,230 | 5/1973 | Delin | 195/36 P |
| 3,769,168 | 10/1973 | Masuda | 195/66 R |

OTHER PUBLICATIONS

Dixon and Webb, Enzymes 2nd Edition 1964 pages 27, 28, 44, 45, 46, 793–808.

Primary Examiner—Lionel M. Shapiro
Attorney, Agent, or Firm—Depaoli & O'Brien

[57] ABSTRACT

The enzyme, penicillin acylase, may be produced in high yield and possess high specific activity from cultures of penicillin acylase-producing microorganisms capable of hydrolytically splitting penicillins to form 6-aminopenicillanic acid (6-APA), and phenylacetic acid, by a purification or enrichment process which includes the steps of contacting a solution containing penicillin acylase and an aluminosilicate whereby the penicillin acylase is sorbed thereon, separating the penicillin acylasealuminosilicate sorbate from said solution and subsequently desorbing penicillin acylase from said aluminosilicate.

32 Claims, 5 Drawing Figures 3,871,962

PENICILLIN ACYLASE

BACKGROUND OF THE INVENTION

The present invention relates to, in general, novel forms of the enzyme, penicillin acylase, derived from bacterial cell suspensions or extracts thereof of those penicillin G splitting bacteria, or enzymes or enzyme enrichments obtained therefrom which preferentially attack the amido-bond in the 6-position of the pencillin molecule. In particular, the present invention is directed to a process for the purification and obtainment of penicillin acylase from certain penicillin acylase-producing bacteria, particularly those of the genera *Escherichia coli* in high yield and with high activity.

Penicillin acylase, also known in the art as penicillin amidase or penicillin deacylase (Enzyme Commission No. 3.5.1.11), has been known for some time because of its ability to hydrolytically cleave the amido bond in the 6-position of benzyl penicillin to form 6-aminopenicillanic acid and phenylacetic acid.

This characteristic of penicillin acylase has been and is now being exploited world wide on a large industrial scale in a process for the manufacture of 6-aminopenicillanic acid in the field of semi-synthetic penicillins of improved medical properties. For example, acylation of 6-aminopenicillanic acid, the "penicillin nucleus," has produced semi-synthetic penicillins of demonstrated effectiveness against the troublesome penicillinase-producing clinically resistant staphylococcal infections.

Generally, the presently employed industrial process is carried out by using whole cells containing the penicillin acylase enzyme, according to German Pat. Specification No. 1,111,778 or using an unpurified enzyme which has been extracted from the bacterial cells as illustrated in U.S. Pat. No. 3,297,546. Still another process for the manufacture of 6-aminopenicillanic acid involves the use of unpurified penicillin acylase sorbed on bentonite as illustrated in U.S. Pat. No. 3,446,705. This process, however, is beset with difficulties and does not provide a process characterized by high yields of desired product undoubtedly due to the fact that the hydrolyzing enzyme sorbed on bentonite was contaminated with other enzymes or proteins capable of decomposing a portion of the penicillins present, thus affording a reduced yield of the desired product, 6-aminopenicillanic acid.

In general, as hereinbefore pointed out, processes for the manufacture of 6-aminopenicillanic acid involving the use of whole bacterial cells or extracted, impure enzymes suffer serious disadvantages, perhaps the most serious of which is that part of the penicillin reactant is decomposed by other enzymes present in such crude preparations, such as penicillin-beta-lactamase, leading to reduced yields of desired product, 6-aminopenicillanic acid. Yet another serious disadvantage of processes for the manufacture of 6-aminopenicillanic acid based on the use of whole cells or extracted, unpurified enzyme is that contaminant proteins are carried over which can lead to allergic reactions in humans when semi-synthetic penicillins produced therefrom are administered. While such proteinaceous impurities can be removed from the 6-aminopenicillanic acid produced by such processes, it can only be done by expensive purification procedures but not without considerable losses of product.

It has long been recognized that the aforesaid disadvantages could be readily avoided by the use of pure and preferably crystalline penicillin acylase, yet, heretofore, a relatively simple, inexpensive process capable of being carried out commercially and on an industrial scale for the production of substantially pure penicillin acylase has not existed.

Accordingly, a primary object of this invention resides in the provision of a relatively simple process for the production of substantially pure penicillin acylase.

A further object of the invention resides in the provision of means and methods for the production of crystalline penicillin acylase.

Yet another object of the invention resides in the provision of a process for the isolation and crystallization of a substantially pure penicillin acylase from bacterial cells and especially from bacterial cells of *Escherichia coli*.

Still another object of this invention resides in the provision of a novel process for the production of a suspension of crystalline penicillin acylase which is stable and capable of storage and transportation without loss of enzyme activity relative to its ability to produce 6-aminopenicillin acid.

Yet still another object of the invention resides in the provision of a process for the production of relatively pure penicillin acylase enzyme in a relatively simple manner, characterized in that the 6-aminopenicillanic acid produced therefrom is substantially free of foreign proteins which can lead to allergic reaction in humans upon administration of semi-synthetic penicillins produced therefrom.

The aforesaid and other objects of the invention will become more readily apparent hereinafter as the description of the invention proceeds.

In accordance with the invention, the aforesaid objects of the invention can be readily achieved by a process for the purification of penicillin acylase comprising sorbing a penicillin acylase solution onto a carrier, such as an aluminosilicate, separating the sorbed penicillin acylase from said solution, eluting said penicillin acylase from said sorbent and recovering the purified penicillin acylase.

A further embodiment of the invention for the production of a purified penicillin acylase comprises contacting a penicillin acylase solution with an aluminosilicate to substantially sorb the penicillin acylase thereon, separating the penicillin acylase-aluminosilicate sorbate from said solution and subsequently desorbing said penicillin acylase therefrom to produce a penicillin acylase solution of improved purity.

Yet another embodiment of this invention resides in the provision of a novel process whereby the enzyme, penicillin acylase, is produced in high yield and high specific activity from penicillin acylase-producing microorganisms.

Still another object of this invention resides in the provision of a process which permits the isolation and crystallization of substantially pure penicillin acylase in high yield and of high specific activiy from penicillin acylase producing microorganisms.

These and yet further objects of the invention will become further apparent from the following detailed description of the invention which follows.

In accordance with the aforesaid objects of the invention, the present invention provides a process for the purification of penicillin acylase derived from bacterial cells, enzyme extracts, and enriched enzyme extracts of said cells, initially in the form of a solution which comprises contacting penicillin acylase and an aluminosilicate to sorb the penicillin acylase thereon, separating the penicillin acylase-aluminosilicate sorbate from the remaining solution, eluting the penicillin acylase from said aluminosilicate and recovering an enriched solution of penicillin acylase.

A more specific and preferred process for the enrichment, purification, and isolation of penicillin acylase containing solutions comprises:

1. adjusting a solution containing an extract of *E. coli* cells and cellular debris and penicillin acylase to a pH value of 3.5 to 5.5 and removing the debris and any precipitated material to produce a first clear solution;
2. sorbing the penicillin acylase on an aluminum silicate to produce a sorbate, separating the sorbate from the solution, and eluting the penicillin acylase from the sorbate to produce a second solution of the penicillin acylase;
3. at least once, sorbing the penicillin acylase in the second solution on a macroporous ion exchanger and eluting it therefrom to produce a third solution of the penicillin acylase, containing purer penicillin acylase than the second solution; and thereupon
4. adding an inorganic salt to the third solution to precipitate the penicillin acylase therefrom.

The preferred process according to the invention starts from a crude extract of *E. coli* cells. This is obtained, for example, from a culture of the *E. coli* cells prepared according to German Patentschrift No. 1,111,778, by treatment with 3% of methyl isobutyl ketone at pH 7–8 and/or by mechanical disintegration, whereby the penicillin acylase is brought into solution to the extent of 70–90%.

Although penicillin acylase derived from microorganisms of the genera Escherichia are preferred penicillin acylases derived from any source are amenable to treatment in accordance with the invention. Thus, penicillin acylase-producing microorganisms of the genera Proteus, Brevibacterium, Bacillus, Achromobacterium, Flavobacterium, Alcaligenes, Streptomyces, Aerobacter, and the like, in addition to microorganisms of the genera Escherichia are suitable sources of the enzyme, penicillin acylase, amenable to the process of the invention.

Typical and representative of the species of genera enumerated above include:

*Bacterium proteus* OX 19
*Escherichia coli* ATCC 9637
*Escherichia coli* ATCC 11105
*Escherichia coli* N 14
*Escherichia coli* W
*Escherichia coli* CM 2 (NRRL B-3181)
*Escherichia coli* CM 5 A (NRRL B-3182)
*Escherichia coli* CM 6 (NRRL B-3183)
*Proteus americanus* ATCC 4675
*Proteus ammoniae* ATCC 4630
*Proteus ammoniae* ATCC 7002
*Proteus ichthyosmius* ATCC 7966
*Proteus inconstans* ATCC 12013
*Proteus inconstans* ATCC 13159
*Proteus mirabilis* ATCC 4630
*Proteus mirabilis* ATCC 4675
*Proteus mirabilis* ATCC 7002
*Proteus mirabilis* ATCC 9240
*Proteus mirabilis* ATCC 9921
*Proteus mirabilis* ATCC 12453
*Proteus mirabilis* ATCC 14153
*Proteus mirabilis* OXK ATCC 15146
*Proteus mirabilis* XK ATCC 7975
*Proteus mirabilis* XK ATCC 8259
*Proteus mirabilis* XK ATCC 10005
*Proteus mirabilis* XK ATCC 14273
*Proteus morgani* ATCC 8019
Proteus morgani ATCC 8076a
*Proteus morgani* ATCC 8076b
*Proteus morgani* ATCC 8076c
*Proteus morgani* ATCC 8076d
*Proteus morgani* ATCC 8076e
*Proteus morgani* ATCC 8076f
*Proteus morgani* ATCC 8076g
*Proteus morgani* ATCC 8076h
*Proteus morgani* ATCC 9237
*Proteus morgani* ATCC 9916
*Proteus morgani* ATCC 9917
*Proteus morgani* ATCC 13045
*Proteus paraamericanus* ATCC 6059
*Proteus rettgeri* ATCC 9250
*Proteus rettgeri* ATCC 9918
*Proteus rettgeri* ATCC 9919
*Proteus rettgeri* ATCC 14505
*Proteus sphingidis* ATCC 6911
*Proteus vulgaris* ATCC 13315
*Proteus vulgaris* ATCC 8427
*Proteus vulgaris* ATCC 9920
*Proteus vulgaris* ATCC 12454
*Proteus vulgaris* X2 ATCC 6897
*Proteus vulgaris* XE ATCC 7829
*Proteus vulgaris* X19 ATCC 881
*Proteus vulgaris* X19 ATCC 6380
*Proteus vulgaris* X19 ATCC 9484
*Proteus vulgaris* XL ATCC 6896

In accordance with the invention, the penicillin acylase solutions derived from penicillin acylase-producing microorganisms of the type described above are contacted with an aluminosilicate sorbent to effect sorbtion of the enzyme thereon.

The sorbents which can be employed with facility for the purification and recovery of penicillin acylase from solutions containing the same include a wide variety of aluminosilicates, both natural and synthetic, which have an amorphous, crystalline, or combination of crystalline and amorphous structures.

One type of sorbent which finds immediate and practical utility in the process of the invention includes aluminosilicates which have either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross-linked by the sharing of oxygen atoms whereby the ratio of total aluminum and silicon atoms to oxygen atoms is 1:2. In their hydrated form, the aluminosilicates may be represented by the formula:

$$M_{2/n}O:Al_2O_3:wSiO_2:YH_2O$$

wherein M represents at least one cation which balances the electrovalence of the tetrahedra, $n$ represents the valence of the cation, $w$ the moles of $SiO_2$ and Y the moles of H₂O. The cation can be any or more of a number of metal ions, depending upon whether the aluminosilicate is synthesized or occurs naturally.

Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the preferred aluminosilicates, one can include Zeolites A, Y, L, D, R, S, T, Z, E, F, Q, B, X, W, KG, J, H, M, O, levynite, lazurite, dachiarite, erionite, natrolites, faujasite, mesolite, analcite, nepheline, paulingite, noselite, phillipsite, brewsterite, flakite, cancrinite, ptiolite, datolite, chabazite, gmelinite, leucite, scapolite, sodalite, mordenite, as well as certain caustic treated clays, such as montmorillonite and kaolin families.

Other synthesized crystalline aluminosilicates include those designated at ZK-4, Zeolite α and ZK-5.

ZK-4 can be represented in terms of mole ratios of oxides as:

0.1 to 0.3R:0.7 to 1.0$M_{2/n}$O:$Al_2O_3$:2.5 to 4.0$SiO_2$:$YH_2O$ wherein R is a member selected from the group consisting of methyl-ammonium oxide, hydrogen oxide and mixtures thereof with one another, M is a metal cation of $n$ valence, and Y is any value from about 3.5 to 5.5. As synthesized, Zeolite ZK-4 contains primary sodium cations and can be represented by unit cell formula:

$Na_{7.5\pm2}H_{2\pm.5}$ [9±2$Al_2O_3$·15±$SiO_2$]

The major lines of the X-ray diffraction patterns of ZK-4 are set forth in Table I below:

TABLE I

| d Value of Reflection in A. | 100 I/I₀ |
| --- | --- |
| 12.00 | 100 |
| 9.12 | 29 |
| 9.578 | 73 |
| 7.035 | 52 |
| 6.358 | 15 |
| 5.426 | 23 |
| 4.262 | 11 |
| 4.962 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.900 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |

TABLE I-Continued

| d Value of Reflection in A. | 100 I/I₀ |
| --- | --- |
| 1.669 | 2 |
| 1.610 | 1 |
| 1.581 | 2 |
| 1.559 | 1 |

ZK-4 can be prepared by preparing an aqueous solution of oxides containing as $Na_2O$, $Al_2O_3$, $SiO_2$, $H_2O$ and tetramethylammonium ion having a composition, in terms of oxide mole ratios, which falls within the following ranges:

| | |
| --- | --- |
| $SiO_2/Al_2O_3$ | 2.5 to 11 |
| $\dfrac{Na_2O}{Na_2O+[(CH_3)_4N]_2O}$ | 0.05 to 0.25 |
| $\dfrac{H_2O}{Na_2O+[(CH_3)_4N]_2O}$ | 25 to 50 |
| $\dfrac{Na_2O+[(CH_3)_4N]_2O}{SiO_2}$ | 1 to 2 | maintaining the mixture at a temperature of about 100°C. to 120°C. until the crystals are formed, and separating the crystals from the mother liquor. The crystal material is thereafter washed until the wash effluent has a pH essentially that of wash water and subsequently dried.

Zeolite α can be represented in terms of mole ratios of oxides as follows:

0.2 to 0.4R:0.6 to 0.8 $M_{2/n}$O:$Al_2O_3$:4.0 to 6.0$SiO_2$:$YH_2O$ wherein R is a member selected from the group consisting of methyl-ammonium oxide, hydrogen and mixtures thereof, M is a metal cation of $n$ valence and Y the moles of $H_2O$.

Zeolite α is prepared in a similar manner as ZK-4 with the exception that mole ratio of silica to alumina is at least 20 to 1, the mole ratio of [$(CH_3)_4N$]$_2$O to $Na_2O$ is about 10 to 1 and the forming temperature is about 60° to 90°C.

ZK-5 can be represented by composition in terms of mole ratios of oxides as:

0.3 to 0.7 $R_{2/m}$O:0.3 to 0.7 $M_{2/m}$O:1$Al_2O_3$:4.0 to 6.0$SiO_2$:$YH_2O$ wherein R is selected from the group consisting of a nitrogen-containing cation derived from N,N'-dimethyltriethylenediammonium ion and mixtures of said cation with hydrogen and m is the valence thereof; M is a metal and n the valence thereof and Y is any value from about 6 to about 10.

The major lines of the X-ray diffraction pattern of ZK-5 are set forth in Table II below. In obtaining the X-ray diffraction powder patterns, standard techniques were employed. The radiation was the KαC doublet of copper, and a Geiger counter spectrometer with a strip chart pen recorder was used. The peak heights, I, and the positions as a function of 2θ, where θ is the Bragg angle, were read from the spectrometer chart. From these, the relative intensities, 100I/I₀ where I₀ is the intensity of the strongest line or peak, and d(obs.), the interplaner spacing in A., corresponding to the recorded lines were calculated.

TABLE II

| hkl | $I/I_0 \times 100$ | d, A. |
|---|---|---|
| 110 | 18 | 13.3 |
| 200 | 100 | 9.41 |
| 220 | 6 | 6.62 |
| 310 | 41 | 5.93 |
| 222 | 48 | 5.41 |
| 321 | 2 | 5.03 |
| 400 | 6 | 4.69 |
| 330 | 50 | 4.41 |
| 420 | 34 | 4.19 |
| 332 | 22 | 3.98 |
| 422 | 18 | 3.81 |
| 510 | 6 | 3.66 |
| 521 | 13 | 3.41 |
| 530, 433 | 35 | 3.21 |
| 611 | 28 | 2.02 |
| 620 | 21 | 2.94 |
| 541 | 2 | 2.88 |
| 622 | 26 | 2.81 |
| 631 | 9 | 2.75 |
| 543, 710, 550 | 11 | 2.64 |
| 640 | 2 | 2.59 |
| 721, 633, 552 | 9 | 2.54 |
| 730 | 3 | 2.45 |
| 732, 651 | 1 | 2.37 |
| 811, 741, 554 | 2 | 2.30 |
| 822, 660 | 3 | 2.20 |
| 831, 750, 743 | 2 | 2.17 |
| 662 | 1 | 2.14 |
| 910, 833 | 3 | 2.06 |
| 842 | 2 | 2.04 |
| 921, 761, 655 | 3 | 2.02 |
| 830, 851, 754 | ½ | 1.97 |
| 932, 763 | 2 | 1.93 |
| 941, 853, 770 | 2 | 1.89 |
| 10,000, 860 | 5 | 1.87 |
| 10, 2, 0, 862 | 5 | 1.83 |
| 10, 3, 1, 952, 765 | 5 | 1.79 |

ZK-5 can be prepared by preparing an aqueous solution of oxides containing $Na_2O$, $Al_2O_3$, $SiO_2$, $H_2O$ and N,N'-dimethyltriethylenediammonium ion having a composition, in terms of oxide mole ratios, which falls within the following ranges:

| | |
|---|---|
| $\dfrac{SiO_2Al_2O_3}{Na_2O}$ | Of from about 2.5 to 15. |
| $\dfrac{Na_2O + C_8H_{18}N_2O}{H_2O}$ | Of from about 0.01 to 0.25. |
| $\dfrac{H_2O}{Na_2O + C_8H_{18}N_2O}$ | Of from about 25 to 50. |
| $\dfrac{Na_2O + C_8H_{18}N_2O}{SiO_2}$ | Of from about 1 to 2. | maintaining the mixture at a temperature of about 90°C. to 120°C. until the crystals are formed, and separating the crystals from the mother liquor. The crystal material is thereafter washed until the wash effluent has a pH essentially that of wash water and subsequently dried.

Other aluminosilicates which can be used are caustic treated clays.

Of the clay materials, montmorillonite and kaolin families are representative types which include the sub-bentonites, such as bentonite, and the kaolins commonly identified as Dixie, McNamee, Georgia, and Florida clays in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230°F. to 1,600°F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling with the following weight ratios:

| | |
|---|---|
| $Na_2O$/clay (dry basis) | 1.0–6.6 to 1 |
| $SiO_2$/clay (dry basis) | 0.01–3.7 to 1 |
| $H_2O/Na_2O$ (mole ratio) | 35–100 to 1 |

It is to be understood that mixtures of the various aluminosilicates previously set forth can be employed as well as individual aluminosilicates.

The preferred process according to the invention employs a crude extract of E. coli cells obtained, for example, from a culture of the E. cooli cells prepared according to German Patentschrift No. 1,111,778 by treatment with 3% methyl isobutyl ketone at pH 7–8 and/or by mechanical disintegration, whereby the penicillin acylase is brought into solution to the extent of 70–90%.

In the preferred process of this invention, the crude extract is brought to a pH value of 3.5 to 5.5, preferably 5.0, to facilitate precipitation of the cell fragments and simultaneous purification of the penicillin acylase by precipitation of inactive protein and other concomitant substances. The pH may be adjusted by adding a mineral acid, for example, HCl, $HNO_3$, $H_2SO_4$, or $H_3PO_4$, or some other strong acid, for example acetic acid. The precipitated material is then generally separated off by centrifuging or filtration, and is discarded.

Once the penicillin acylase is brought into solution, it is generally sorbed onto the aluminosilicate at a specific conductivity of the solution of 0–5 mS and a pH value of 3.5–8.0. Preferably, a conductivity of 1–4 mS and a pH value of 5.0 is maintained in the solution. The solution of the enzyme can, for example, be adjusted to the desired conductivity by dilution, by desalination with mixed bed ion exchangers, or by other customary desalination procedures. The best yield and enrichment in the subsequent elution is achieved if just as much aluminosilicate (preferably bentonite) is added as is required for 100% sorption of the enzyme, this being tested by measuring the enzymic activity present in a sample of the supernatant liquid. Under the preferred conditions, this preferred amount is 2.0–5.0 grams of bentonite per gram of dissolved protein. An even better purification is achieved if a fractional precipitation is carried out by first adding about 1/5 of the total amount of silicate, whereupon (inactive) foreign protein is almost exclusively sorbed. After separating off the added aluminosilicate carrying the foreign protein, the penicillin acylase is then sorbed by adding the remaining amount.

Elution of the penicillin acylase is readily accomplished by the addition of 0.1–1.0 molar aqueous solution of one or more inorganic or organic salts, such as, for example, phosphate, sulphate or acetate, at a pH value of 6.0–9.0, is used to elute the sorbed penicillin acylase. Most preferably, a 0.1–1.0 molar solution of sodium or potassium acetate at about pH 8.5 is used since penicillin acylase is more preferentially eluted by such salts of monovalent anions than by salts of divalent and trivalent anions.

In total, a four to six-fold enrichment, in about 70–90% yield, can be achieved by the sorption on an aluminosilicate, such as bentonite, and elution of the enzyme according to the invention. The particular advantages of this purification step are the simplicity with which it can be carried out even on an industrial scale, the possibility of reducing the volume of the solution containing the emzyme to 1/10 of that of the crude extract, and the isolation of a concentrated solution of the enriched enzyme, which substantially facilitates further processing.

According to the preferred process of the invention, the penicillin acylase in the second solution is further purified by sorption on an elution from at least one macroporous ion exchanger. Either an anion exchanger, or a cation exchanger, or both (sequentially and alternately), may be used.

Preferred anion exchangers are, for example, cellulose carrying basic substituent groups, for example, aminoethylcellulose, diethylaminoethylcellulose (DEAE-cellulose), triethylaminoethylcellulose (TEAE-cellulose) and corresponding transversely cross-linked dextranes, for example, DEAE-Sephadex and QAE-Sephadex. Purificaiton using anion exchangers is generally carried out at pH 6.5–9.0.

The penicillin acylase may be sorbed on the anion exchanger either by passing the solution through a colunm of the exchanger, or by mixing the exchanger, in loose form, with the solution of penicillin acylase. The enzyme is generally sorbed on the anion exchanger from a dilute salt solution and eluted by another buffer solution either of similar salt concentration but lower pH, or of higher concentration but similar pH, or of both lower pH and higher concentration.

A preferred method of elution from the anion exchanger is the use of potassium phosphate solution of pH about 7.0 and increasing in concentration in the range of 0.01 to 0.1 M.

The penicillin acylase activity always appears in the first protein peak eluted from the anion exchanger. Yields of 80–90% can be achieved in this step.

Preferred cation exchangers are, for example, cellulose carrying acidic substituent groups (for example, sulphoethyl-cellulose, phospho-cellulose and carboxymethyl-cellulose), transversely crosslinked dextranes (for example, SE-Sephadex, SP-Sephadex and CM-Sephadex), acrylamide gels (for example, CM-Bio-Gel) or polyacrylamide gels containing carboxyl groups [produced, for example, according to Biochemistry 8, 4074 (1969)] and macroporous resin ion exchangers (for example, Lewatit SP-100, SP-120, and CNP).

Sorption of the enzyme on the cation exchanger may be effected either by passing the solution through a colunm of the exchanger or by mixing the exchanger, in loose form, with the solution of enzyme. Sorption on the cation exchanger is generally carried out from a 0.01–0.1 M salt solution of pH 3.5 to 6.0, preferably at pH 5.0. The enzyme is generally eluted from the cation exchanger either by a salt solution of pH 6.0 to 8.5 or, preferably by a salt solution of pH 3.5 to 6.0 (preferably 5.0) and continuously or incrementally increasing concentration.

A preferred mode of elution from the cation exchanger uses an aqueous solution of sodium or potassium acetate having pH of about 5.0 and increasing linearly in concentration within the range of 0.05 to 0.5 M. The penicillin acylase is eluted under tjese conditions as a sharp zone when the eluting solution reaches a concentration of about 0.2 M acetate; a yield of 80–90% can thus be obtained.

The enzyme is precipitated from the third solution obtained in the preferred process from the ion exchanger or exchangers by adding a suitable salt, preferably ammonium sulphate.

It is possible to obtain crystalline penicillin acylase in this precipitation.

The salt, such as ammonium sulphate, can be added as a concentrated solution or in the solid form. Before addition of the salt, very dilute solutions of the enzyme can beforehand be concentrated in accordance with known processes, for example, by membrane filtration or by precipitation with ammonium sulphate up to 70% saturation and redissolving of the precipitate in a smaller volume. Depending on the protein concentration, precipitation is generally started by adding ammonium sulphate, solid or as a solution, until the enzyme solution is 45–55% saturated in ammonium sulphate, at a pH of 6.0–7.0. Crystallization follows over the course of several days. Crystals that have formed rapidly can be seen to have the shape of splintered needles under the microscope. On slow crystallization, very regular plates are obtained.

The activity of the penicillin acylase purified or isolated by the process of the invention was determined by a new colorimetric test which exploits the broad specificity of the enzyme. The substrate used is 6-nitro-3-(N-phenylacetyl)-acid benzoic acid (NIPAB). The measurement is carried out in 0.002 M solution of pH 7.5 at 25°C., at 405 nm. The molar extinction coefficient of the 6-nitro-3-aminobenzoic acid produced in the reaction is 9,090 1. mole$^{-1}$.cm$^{-1}$. One enzyme unit of penicillin acylase (U) splits 1$\mu$ mole of the substrate per minute. The splitting of benzylpenicillin under the same conditions is about 1.5 times more rapid. The specific activities are related to protein determined by the Biuret method.

Figure 2:

In the accompanying drawings:

FIG. 1 is a sketch of the crystals of penicillin acylase made from a photograph at 200 magnifications obtained by slow crystallization according to the prefered process of the invention. FIG. 2 is a disc-electrophorogram (7% gel, pH 8.9) of crystalline penicillin acylase produced by the process of the invention, showing a single sharp band.

Figure 3A:
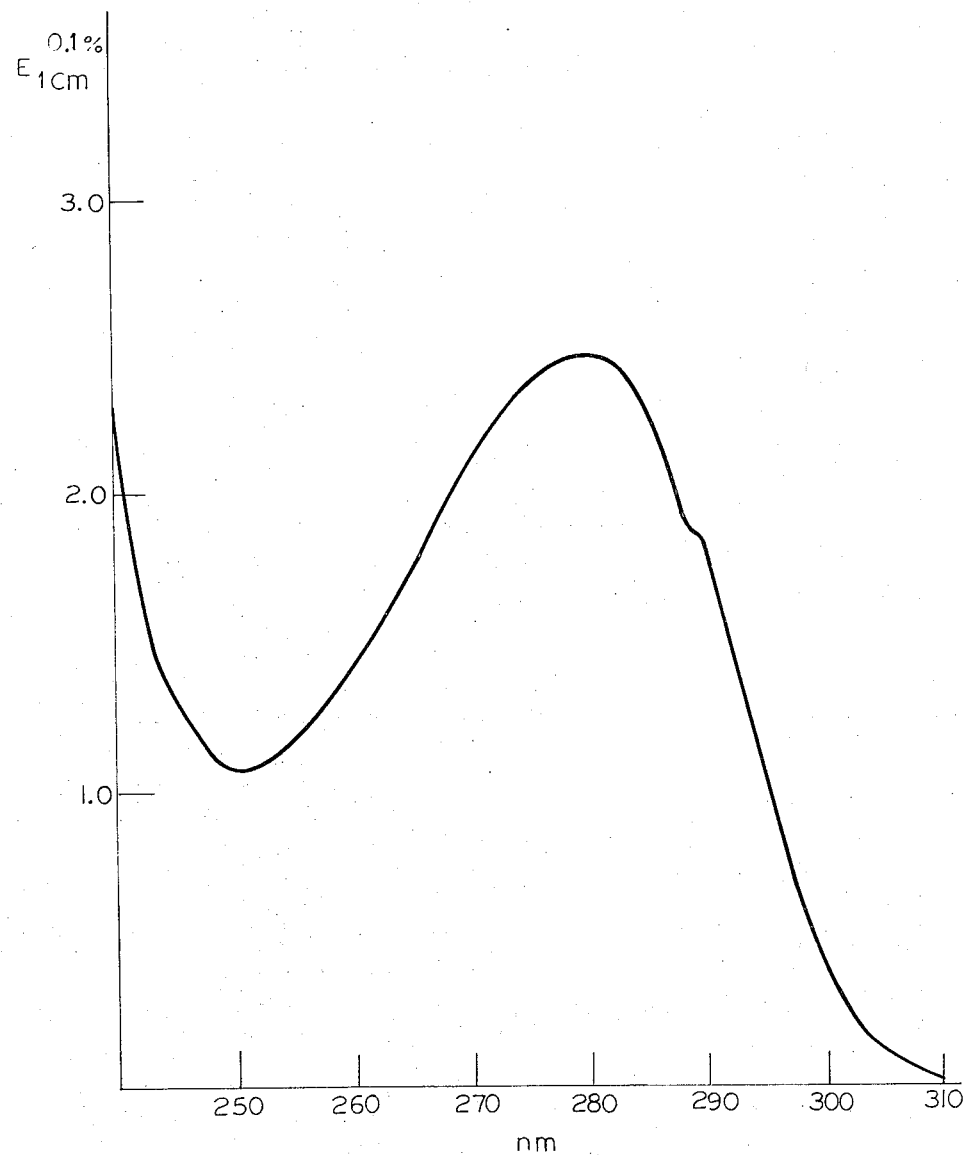
Figure 3B:
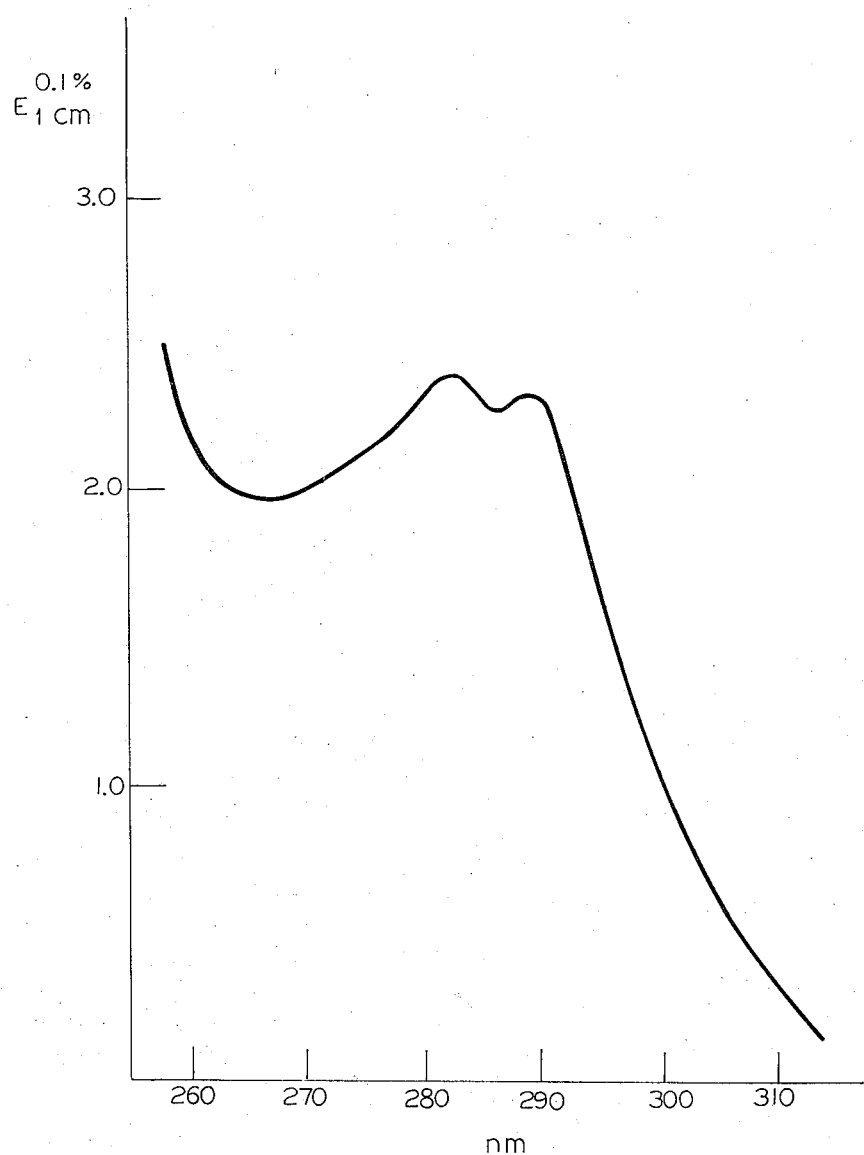

FIG. 3 shows UV-spectra of penicillin acylase produced by crystallization in accordance with the invention; FIG. 3A was taken in phosphate buffer at pH 7.0; FIG. 3B in 0.1N NaOH.

Figure 4:
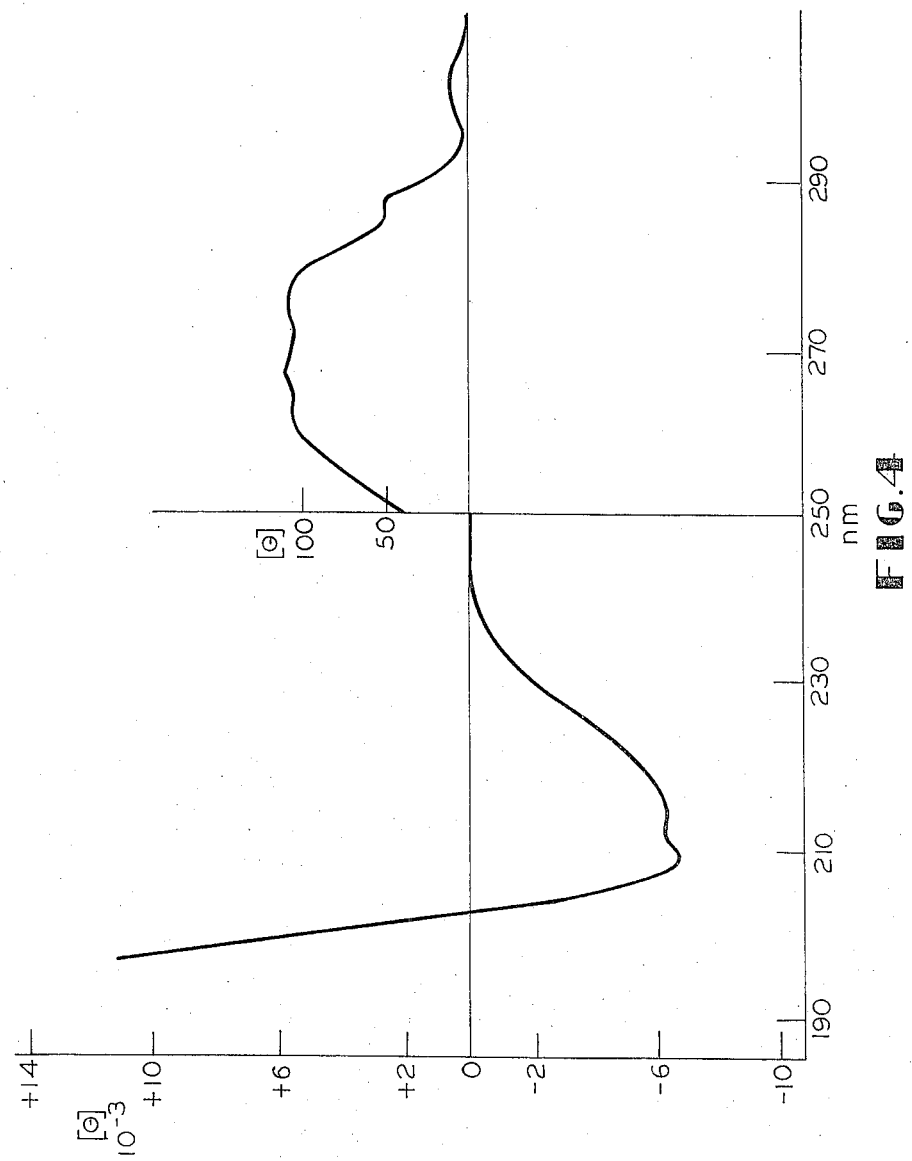

FIG. 4 is a Circular Dichroism (CD) spectrum of penicillin acylase produced by crystallization according to the invention. The spectrum was taken at pH 4–10 under the following conditions:

| <250 nm: | 0.085 | mg/ml, $d$ | = | 0.1 cm. |
|---|---|---|---|---|
| >250 nm: | 0.85 | mg/nl, $d$ | = | 1 cm. |

The novel article of manufacture produced in accordance with the invention comprises penicillin acylase (preferably crystalline penicillin acylase) characterized by the following properties:
 a. one band only in electrophoresis (Millipore-Phoroslide System) at pH 5.0 and 8.5;
 b. a single, symmetrical, protein peak and activity peak in gel chromatography (e.g., on Sephadex G—150);
 c. a molecular weight of 65,000 to 75,000 as determined by thin layer gel chromatography (e.g., on Sephadex G–100);
 d. an isoelectric point of pH $6.8 \pm 0.2$; and
 e. a UV-spectrum having a maximum at 278 nm, a miniumum at 248 nm, and a shoulder at 289 nm.

The penicillin acylase according to the invention preferably has, alternatively or in addition, the following properties:
 a. specificity: splitting of benzylpenicillin, N-phanacetyl-L-asparagine, 6-nitro-3(N-phenacetyl)aminobenzok acid and preferably also other amides of phenylacetic acid;
 b. molecular weight $71,000 \pm 2,000$ as determined by sedimentation equilibrium with a partial specific volume of $\tilde{v} = 0.665$ ml/g;
 c. molecular weight $70,000 \pm 5,000$ as determined by thin layer gel filtration;
 d. sedimentation coefficient $S°_{20,w} = 2.56 \pm 0.035$ at pH 7.4;
 e. UV-spectrum substantially as shown in FIGS. 3A and 3B;
 f. CD-spectrum at pH 4–10 substantially as shown in FIG. 4; and
 g. isoelectric point of pH $6.8 \pm 0.2$ as determined by electrofocusing.

The words Sephadex and Biogel are trade names of Pharmacia Fine Chemicals, A.B., Uppsala, Bio-Rad Laboratories, and the word Lewatit is a trade name of Bayer A.G.

The following examples illustrate the invention. The units ("U") of penicillin acylase referred to are the units defined above.

EXAMPLE 1 a. The crude extract of *E. coli* cells required for carrying out the process according to the invention is obtained by culturing *E. coli* according to German Patnetschrift No. 1,111,778, concentrating the culture by centrifuging to provide a sludge, disintegrating the cells by adding 3% methyl isobutyl ketone, adjusting the pH value of 7.5, and then stirring for several hours.

b. 90 liters of the crude extract thus obtained were adjusted to pH 5.0 in accordance with the invention, and centrifuged. Eighty liters of clear solution, containing 62,000 units of specific activity 0.25 U/mg, were obtained. This solution was desalinated to 1.5 mS by stirring a mixed bed ion exchanger (Lewatit M 600 and S 100) into it. After filtering off the ion exchanger, 350 grams of bentonite (type SF., Messrs. Serva, Heidelberg) were added while the pH was readjusted to 5.0. The mixture was stirred for 30 minutes and the bentonite carrying sorbed penicillin acylase was separated off in a continuous centrifuge. The penicillin acylase was eluted from the bentonite with 5 liters of 0.5 M sodium phosphate buffer of pH 8.0, and the bentonite filtered off. 5.2 Liters of eluate, containing 40,000 U (65%) of specific activity 1.45 U/mg., were obtained.

c. 9,000 U of this eluate were desalinated by gel filtration, adjusted to pH 5.0 and charged onto a 5 × 100 cm. column of SE-Sephadex, equilibrated with 0.05 M sodium acetate of pH 5.0. Elution was carried out with a linear gradient from 4 liters of 0.07 M and 4 liters of 0.25 M sodium acetate, pH 5.0. The combined active fractions contained 8,100 U (90%). After concentration by precipitation with ammonium sulphate until 70% saturation was reached, the specific activity of the concentrated enzyme solution was 5.8 U/mg.

d. Saturated ammonium sulphate solution was added to the concentrated solution of the enzyme until approximately 50% saturation was reached. A precipitate appearing as a slight cloudiness was centrifuged off. On storage at 4°C., crystallization of the penicillin acylase started after a few days.

EXAMPLE 2

Sixty liters of a disintegrated crude extract produced according to Example 1(a) were adjusted to pH 5.0 and centrifuged. The supernatant clear solution contained 92,000 U of specific activity 0.45. It was desalinated to 1.0 mS by adding mixed bed ion exchanger. 150 Grams of bentonite were first added to this solution at pH 5.0 and centrifuged off. A further 200 grams of bentonite were then added, centrifuged off and treated with 5 liters of 1 M sodium acetate at pH 8.0 to eluate the enzyme. Result: 51,000 (53%) of specific activity 1.8 U/mg.

The eluate was desalinated by gel filtration and a solution of the pure enzyme was obtained therefrom, as described in Example 1(c), by chromatography on SE-Sephadex. The solution was concentrated and the penicillin acylase was crystallized by adding saturated ammonium sulphate solution as described in Example 1(d).

EXAMPLE 3

A disintegrated crude extract obtained according to Example 1(a) from 2,900 liters of *E. coli* culture was adjusted to pH 5.0 and centrifuged. The supernatant clear solution (256 liters) contained 150,000 U of specific activity 0.32. The specific conductivity was reduced to 2 mS by dilution to 920 liters with water. One kilogram of bentonite was added and the resultant sorbate centrifuged off after stirring for 1 hour. Elution of the enzyme from the sorbate with 0.5 M sodium acetate at pH 8.0 gave 6.9 liters of solution, containing 62,000 U of specific activity 1.2 U/mg. A further 9,800 U were obtained by a second elution of the bentonite with 0.5 M sodium phosphate. Total yield 47%.

47,000 U of the first eluate were desalinated by gel filtration, adjusted to pH 5.0 and sorbed quantitatively by stirring in about 400 ml. of moist SE-Sephadex equilibrated with 0.05 M sodium acetate of pH 5.0. The SE-Sephadex gel was filtered off and packed into a column of 5 cm. diameter which already contained 1,600 ml. of fresh SE-Sephadex in 0.05 M sodium acetate at pH 5.0. Elution was then carried out with a linear gradient of 4 liters of 0.07 M and 4 liters of 0.25 M sodium acetate at pH 5.0. The combined active fractions contained 36,000 U of the pure enzyme of specific activity 5.3 U/mg.

The solution of the pure enzyme was concentrated and carefully treated with solid ammonium sulphate until a slight cloudiness appeared. Crystallization of the penicillin acylase took place after a few days of 4°C.

EXAMPLE 4 a. The crude extract of E. coli cells required for carrying out the process according to the invention was obtained by concentrating a culture of E. coli according to German Pat. No. 1,111,778 by centrifuging to give a sludge and mechanically disintegrating the cells optionally with the addition of 3% methyl isobutyl ketone.

b. In accordance with the invention, 610 liters of the crude extract thus obtained, containing $1.3 \times 10^6$U, were diluted with deionized water to 2,100 liters, adjusted to pH 5.0 with sulphuric acid and centrifuged. $1.42 \times 10^6$U, of specific activity 0.42 U/mg were found in the clear supernatant liquid. 13.8 Kilograms of bentonite (type B II, Messrs. Erbsloh) were stirred in while the pH was adjusted to 5.0 and were removed in a continuous centrifuge after 30 minutes. The bentonite removed was treated with 90 liters of 0.5 M sodium acetate solution at pH 8.0 to elute the enzyme and filtered off. 92.5 Liters of eluate, containing $1.12 \times 10^6$ U (86%) of specific activity 1.64 U/mg were obtained.

c. One liter of the eluate obtained according to (b) was dialyzed against 0.001 M potassium phosphate buffer at pH 7.0: 8,250 U, 1.8 U/mg.

The enzyme solution was passed over a 10 × 15 cm. column of DEAE-Sephadex A-50 in the same buffer. Elution was subsequently carried out with a linear gradient of 2 liters of 0.01 M and 2 liters of 0.1 M buffer, at pH 7.0. Fractions of 25 ml. were collected. Penicillin acylase was found in fractions 110–170; yield: 1:2 liters, 6,760 U (82%), 6 U/mg.

d. The solution from (c) was precipitated by adding solid ammonium sulphate (472 g/liter) and the precipitate was centrifuged off and dissolved in water. A part of this solution, containing 4,700 U, was treated with ammonium sulphate until 46% saturated, clarified by centrifuging and stored at room temperature. Crystallization started within a week. The crystals were centrifuged off, dissolved in 0.01 M phosphate buffer and dialyzed against the same buffer. Yield 3,300 U (70%) with 12.45 U/mg.

EXAMPLE 5

Sixty liters of a disintegrated crude extract produced according to Example 4(a) were adjusted to pH 5.0 and centrifuged. The supernatant clear solution contained 155,000 U of specific activity 0.3 U/mg. It was desalinated to 1.0 mS by adding mixed bed ion exchangers. 200 Grams of bentonite (type SF, Messrs. Serva) were first added to this solution at pH 5.0, centrifuged off and discarded; a further 800 grams were then added and centrifuged off, and the sorbed enzyme eluted with 20 liters of 0.5 M sodium acetate at pH 8.0. Result: 110,000 U, 1.5 U/mg.

The enzyme solution was dialyzed against 0.5 M sodium acetate buffer at pH 5.0 and charged onto an 11 × 95 cm. column filled with SE-Sephadex C-50 in 0.05 M sodium acetate at pH 5.0. The enzyme was eluted from column with a linear gradient of 15 liters of 0.07 M and 15 liters of 0.25 M sodium acetate at pH 5.0. Penicillin acylase was present in the eluate, which had a volume of 24–27 liters. Result: 88,000 U (80%), 4.2 U/mg.

29,000 U of this solution were dialyzed against 0.01 M potassium phosphate buffer at pH 7.0 and charged onto an 11 × 25 cm. column of DEAE-Sephadex A-50 in 0.01 M potassium phosphate at pH 7.0. The elution was carried out with a gradient of 0.01 to 0.1 M potassium phosphate at pH 7.0. Penicillin acylase was eluted towards the end of the gradient: Result: 21,000 U (73%), 11.2 U/mg.

A part of this solution, containing 6,000 U, was brought to about 45% saturation with solid ammonium sulphate. After about 2 weeks, large crystals formed on the wall of the vessel. After a further 2 weeks at room temperature, the crystals were centrifuged off and an aliquot part was dissolved in water. Yield: 4,260 U (71%), 13.1 U/mg.

EXAMPLE 6

A bentonite eluate produced according to Example 4, containing 4,100 U with 2.0 U/mg. was dialyzed against 0.05 M sodium acetate at pH 5.0 and passed over a 2.5 × 25 cm. column with Lewatit SP-100, Na+ form. Elution was carried out with a gradient of 0.05–0.5 M sodium acetate at pH 5.0. The active fractions contained 2,020 U (56%), 6.6 U/mg.

The enzyme solution was adjusted to pH 6.5 with NaOH and the pure enzyme was caused to crystallize by adding solid ammonium sulphate up to 48% saturation. Yield: 1,250 U (62%), 12.1 U/mg.

EXAMPLE 7

By substituting Zeolite X for the bentonite of Example 1, similar results are obtained.

EXAMPLE 8

Zeolite Y, when substituted for bentonite in Example 1, provides similar results.

EXAMPLE 9

Similar results are obtained by substituting mordenite for bentonite in the procedure outlined in Example 1.

EXAMPLE 10

When Zeolite A is substituted in Example 1 for bentonite, similar results are obtained.

EXAMPLE 11

Similar results are obtained following the procedure of Example 1 by substituting erionite for bentonite.

EXAMPLE 12

Equivalent results are obtained when ptiolite is substituted for bentonite in the procedure of Example 1.

While the invention has been described in various of its embodiments as illustrated above, it is readily apparent that it is capable of many variations and permutations as will be readily apparent to those skilled in the art, and it is intended, therefore, that such variations and permutations be included herein without departing from the spirit and scope of the invention.

I claim:

1. A process for the purification of penicillin acylase from penicillin acylase producing bacteria, initially in the form of a solution, comprising sorbing the penicillin acylase on an aluminosilicate to produce a sorbate, separating the sorbate from the solution, and eluting the penicillin acylase from the sorbate to produce a second, purer, solution of penicillin acylase.

2. A process for the isolation of penicillin acylase comprising:

1. adjusting an extract of penicillin acylase producing bacteria cells containing cellular debris as well as penicillin acylase to a pH value of 3.5 to 5.5 and removing the debris and any precipitated material to produce a first solution, 2. sorbing the penicillin acylase on an aluminosilicate to produce a sorbate, separating the sorbate from the solution, and eluting the penicillin acylase from the sorbate to produce a second solution of the penicillin acylase, 3. at least once, sorbing the penicillin acylase in the second solution on a macroporous ion exchanger and eluting it therefrom to produce a third solution of the penicillin acylase, containing purer penicillin acylase than the second solution; and 4. adding an inorganic salt to the third solution to precipitate the penicillin acylase therefrom.

3. The process of claim 2, which includes the prior step of growing a culture of penicillin acylase producing bacteria to produce the cells and lyzing them.

4. The process of claim 3 in which the cells are lyzed by adding about 3 weight percent of methyl isobutyl ketone (based on the total weight of the culture) at pH 7 to 8.

5. The process of claim 2 in which the pH is adjusted in step 1 to pH 5.0.

6. The process of claim 2 in which the aluminosilicate is of the montmorillonite type.

7. The process of claim 6 in which the aluminosilicate is bentonite.

8. The process of claim 2 in which the penicillin acylase is sorbed on the aluminosilicate at a conductivity of the solution of 0 to 5 mS and a pH of 3.5 to 8.0.

9. The process of claim 8 in which the penicillin acylase is sorbed on the aluminosilicate at a conductivity of 1 to 4 mS and pH 5.0.

10. The process of claim 2 in which about one-fifth of the aluminosilicate is added intially and separated, and the remainder is then added.

11. The process of claim 2 in which the penicillin acylase is eluted from the sorbate with a 0.1 to 1.0 M solution of sodium or potassium acetate at about pH 8.5.

12. A process for the purification of penicillin acylase comprising:

1. adjusting an extract of bacterial cells containing cellular debris and penicillin acylase to a pH value of 3.5–5.5 and removing the debris and any precipitated material to produce a first solution of penicillin acylase;

2. sorbing the penicillin acylase in said first solution onto an aluminosilicate to produce a penicillin acylase-aluminosilicate sorbate, separating the sorbate from said first solution and eluting said penicillin acylase from said aluminosilicate with a 0.01–0.1 M salt solution selected from the group consisting of sodium acetate and potassium acetate at a pH of about 8.5 to produce a second solution of penicillin acylase;

3. contacting said second solution of penicillin acylase with at least one macroporous ion exchange resin to sorb the penicillin acylase in said second solution thereon, separating said penicillin acylase-ion exchange resin sorbate from said second solution and eluting the penicillin acylase from said ion exchange resin to produce a third solution of penicillin acylase; and 4. adding an inorganic salt to said third solution to precipitate penicillin acylase therefrom; and 5. recovering the penicillin acylase thus produced.

13. The process of claim 12 in which the penicillin acylase is sorbed on and eluted from a macroporous cation exchanger in step 3.

14. The process of claim 13 in which the penicillin acylase is sorbed on the cation exchanger in step 3 from a 0.01 to 0.1 M salt solution of pH 3.5 to 6.0.

15. The process of claim 14 in which the penicillin acylase is eluted from the cation exchanger in step 3 by a salt solution of pH 3.5 to 6.0 continuously or incrementally increasing in concentration.

16. The process of claim 12 in which the penicillin acylase is eluted from the cation exchanger in step 3 by a solution of sodium or potassium acetate of pH about 5.0 and increasing linearly in concentration within the range of 0.05 to 0.5 M.

17. The process of claim 12 in which the penicillin acylase is sorbed on and eluted from a macroporous anion exchanger in step 3.

18. The process of claim 17 in which the penicillin acylase is eluted from the anion exchanger in step 3 by a solution of potassium phosphate of pH about 7.0 and increasing in concentration in the range of 0.01 to 0.1 M.

19. The process of claim 12 in which at least one anion exchanger and at least one cation exchanger are used sequentially and alternately.

20. The process of claim 12 in which the penicillin acylase is precipitated in step 4 by the addition of ammonium sulphate at a pH of 6.0 to 7.0 until 45–55% saturation in ammonium sulphate is reached.

21. A solution of penicillin acylase purified by the process of claim 1.

22. Penicillin acylase having the following properties:
  a. one band only in electrophoresis at pH 5.0 and pH 8.5;
  b. a single symmetrical protein peak and activity peak in gel chromatography;
  c. a molecular weight of 65,000 to 75,000 as determined by a thin layer gel chromatography;
  d. an isoelectric point of pH $6.8 \pm 0.2$;
  e. in the UV-spectrum, a maximum at 278 nm, a minimum at 248 nm and a shoulder at 289 nm.

23. Crystalline penicillin acylase having the following properties:
  a. one band only in electrophoresis at pH 5.0 and pH 8.5;
  b. a single symmetrical protein peak and activity peak in gel chromatography;
  c. a molecular weight of 65,000 to 75,000 as determined by a thin layer gel chromatography;
  d. an isoelectric point of pH $6.8 + 0.2$;
  e. in the UV-spectrum, a maximum at 278 nm, a minimum at 248 nm and a shoulder at 289 nm.

24. The process for the isolation of the enzyme penicillin acylase from solutions containing the same which comprises contacting a solution containing penicillin acylase and an aluminosilicate for a period of time sufficient to sorb the penicillin acylase thereon and separating the penicillin acylase-aluminosilicate sorbate from said solution.

25. The process of claim 24 wherein the aluminosilicate is bentonite.

26. The process of claim 24 wherein the aluminosilicate is a member of the montmorillonite family.

27. The process of claim 24 wherein the aluminosilicate is Zeolite X.

28. The process of claim 24 wherein the aluminosilicate is Zeolite Y.

29. The process of claim 24 wherein the aluminosilicate is mordenite.

30. The process of claim 24 wherein the aluminosilicate is Zeolite A.

31. The process of claim 24 wherein the aluminosilicate is erionite.

32. The process of claim 24 wherein the aluminosilicate is ptiolite.

* * * * *

UNITED STATES PATENT OFFICE
CERTIFICATE OF CORRECTION

Patent No. 3,871,962            Dated March 18, 1975

Inventor(s) Carl Kutzbach

It is certified that error appears in the above-identified patent and that said Letters Patent are hereby corrected as shown below:

Column 2, line 24, change "aminopenicillin" to --aminopenicillanic--

Column 6, line 20, complete line.

Column 10, line 5, change "tjese" to --these--

Column 13, line 30, change "1:2 liters" to --1.2 liters--.

In the claims, delete claim 22.

Signed and Sealed this thirtieth Day of September 1975

[SEAL]

Attest:

RUTH C. MASON
Attesting Officer

C. MARSHALL DANN
Commissioner of Patents and Trademarks